(12) United States Patent
Nishino et al.

(10) Patent No.: US 7,458,438 B2
(45) Date of Patent: Dec. 2, 2008

(54) WORKING VEHICLE WITH A SPEED MAINTAINING APPARATUS

(75) Inventors: Akifumi Nishino, Sakai (JP); Yutaka Inubushi, Sakai (JP)

(73) Assignee: Kubota Corporation, Osaka (JP)

( * ) Notice: Subject to any disclaimer, the term of this patent is extended or adjusted under 35 U.S.C. 154(b) by 656 days.

(21) Appl. No.: 11/209,028

(22) Filed: Aug. 22, 2005

(65) Prior Publication Data
US 2006/0081084 A1    Apr. 20, 2006

(30) Foreign Application Priority Data

Oct. 15, 2004   (JP)   ............... 2004-301538
Oct. 15, 2004   (JP)   ............... 2004-301539

(51) Int. Cl.
*G05G 11/00*   (2006.01)

(52) U.S. Cl. ............... 180/305; 74/479.01; 74/480 R; 74/481

(58) Field of Classification Search ............... 180/167, 180/170, 305, 337, 364; 74/479.01, 480 R, 74/481, 482

See application file for complete search history.

(56) References Cited

U.S. PATENT DOCUMENTS

| | | | | |
|---|---|---|---|---|
| 3,537,328 | A * | 11/1970 | Allen | 74/481 |
| 3,606,957 | A * | 9/1971 | Fuzzell | 414/713 |
| 3,898,891 | A * | 8/1975 | Colloton | 74/473.11 |
| 4,608,879 | A * | 9/1986 | Ishida et al. | 74/473.16 |
| 4,641,545 | A * | 2/1987 | Rabe | 74/473.19 |
| 5,211,070 | A * | 5/1993 | Hirata et al. | 74/473.21 |
| 5,215,056 | A * | 6/1993 | Harada et al. | 477/109 |
| 5,263,385 | A * | 11/1993 | Hirata et al. | 74/481 |
| 6,237,711 | B1 * | 5/2001 | Hunt | 180/336 |
| 6,250,414 | B1 * | 6/2001 | Sato et al. | 180/307 |
| 6,279,937 | B1 * | 8/2001 | Hunt | 180/336 |
| 6,347,560 | B1 | 2/2002 | Maezawa et al. | |
| 6,708,805 | B2 * | 3/2004 | Samejima et al. | 192/13 A |
| 7,337,870 | B2 * | 3/2008 | Izukura et al. | 180/307 |

FOREIGN PATENT DOCUMENTS

JP    2004-211776    7/2004

\* cited by examiner

*Primary Examiner*—Christopher Ellis
*Assistant Examiner*—Vaughn T Coolman
(74) *Attorney, Agent, or Firm*—The Webb Law Firm

(57) ABSTRACT

A working vehicle with a speed maintaining apparatus having a plurality of wheels including at least one driven wheel; a vehicle body supported by the plurality of wheels; an engine supported by the vehicle body; a stepless transmission driven by the engine and capable of changing speed of power to the driven wheel; a neutral return device for biasing the stepless transmission toward a neutral position; a change speed pedal operatively connected to the stepless transmission; a speed maintaining device for maintaining the stepless transmission in a desired speed position; a speed setting lever movable to a retreat position and to positions in a forward speed range for setting the stepless transmission to the desired speed position in which the stepless transmission is maintained by the speed maintaining device; a relay rocking element connected to the stepless transmission through an auxiliary rocking element pivotable relative to the relay rocking element; and a control member provided in the speed maintaining device to be movable with the speed setting lever.

12 Claims, 13 Drawing Sheets

WORKING VEHICLE WITH A SPEED MAINTAINING APPARATUS

BACKGROUND OF THE INVENTION

This invention relates to a working vehicle having a speed maintaining apparatus.

In a speed maintaining construction of a conventional working vehicle, a control member is displaced, in response to a pivoting to a retreat position of a speed setting lever, to a position deviating from a pivoting range of a relay rocking element linked to a stepless transmission. This cancels a speed set by the speed maintaining apparatus, and permits a change speed pedal to shift the stepless transmission for forward drive speeds and backward drive speeds.

It has been considered, with the conventional apparatus, to set the retreat position of the speed setting lever to a position very remote in a forward drive decelerating direction (backward drive accelerating direction) from a forward speed setting range of the speed setting lever so that, when the speed setting lever is operated to the retreat position, the control member deviate from the pivoting range of the relay rocking element in the pivoting direction of the relay rocking element, or to set the retreat position of the speed setting lever to a position displaced leftward or rightward from the forward speed setting range of the speed setting lever so that, when the speed setting lever is operated to the retreat position, the control member deviate from the pivoting range of the relay rocking element in a direction perpendicular to the pivoting direction of the relay rocking element (see, for example, Japanese Patent Applications "Kokai" No. 2004-211776 and "Kokai" No. 2001-82597).

In the above prior art, where the retreat position of the speed setting lever is set to a position very remote in the forward drive decelerating direction from the forward speed setting range of the speed setting lever, it is necessary to secure, as the operating range of the speed setting lever, on a limited lever guide, not only the forward speed setting range but also a range for forming space between the relay rocking element and control member for allowing pivoting of the relay rocking element interlocked with a backward drive shifting of the stepless transmission by the change speed pedal. This greatly restricts the forward speed setting range on the lever guide. Where an operating angle of the speed setting lever is made large in order to facilitate precise speed setting for effective operation of the speed setting lever, the speed setting lever must be shortened correspondingly, which will require a strong operating force. Conversely, where the speed setting lever is formed long in order to reduce the operating force, the operating angle of the speed setting lever will become correspondingly small, making it difficult to effect precise speed setting.

On the other hand, where the retreat position of the speed setting lever is set to a position displaced leftward or rightward from the forward speed setting range of the speed setting lever, the speed setting lever must be made pivotable transversely as well as in the fore and aft direction. This leads to a complication of the construction.

SUMMARY OF THE INVENTION

The object of this invention is to provide a working vehicle having a speed maintaining construction that is an improvement on the above-noted apparatus known in the art.

A working vehicle with a speed maintaining apparatus according to this invention comprises:

a plurality of wheels including at least one driven wheel;

a vehicle body supported by the plurality of wheels;

an engine supported by the vehicle body;

a stepless transmission driven by the engine and capable of changing speed of power to the driven wheel;

a neutral return device for biasing the stepless transmission toward a neutral position;

a change speed pedal operatively connected to the stepless transmission;

a speed maintaining means for maintaining the stepless transmission in a desired speed position;

a speed setting lever movable to a retreat position and to positions in a forward speed range for setting the stepless transmission to the desired speed position in which the stepless transmission is maintained by the speed maintaining means;

a relay rocking element connected to the stepless transmission through an auxiliary rocking element pivotable relative to the relay rocking element; and a control member provided to the speed maintaining means to be movable with the speed setting lever, the control member contacting and retaining the auxiliary rocking element in response to a movement of the speed setting lever from the retreat position to a position in the forward speed range, thereby restricting movement of the auxiliary rocking element relative to the relay rocking element, and allowing displacement of the relay rocking element by an amount corresponding to an amount of operation of the speed setting lever in the forward speed range, and thereby allowing the stepless transmission to be operated to the desired speed position.

DETAILED DESCRIPTION OF THE PREFERRED EMBODIMENTS

Figure 1:
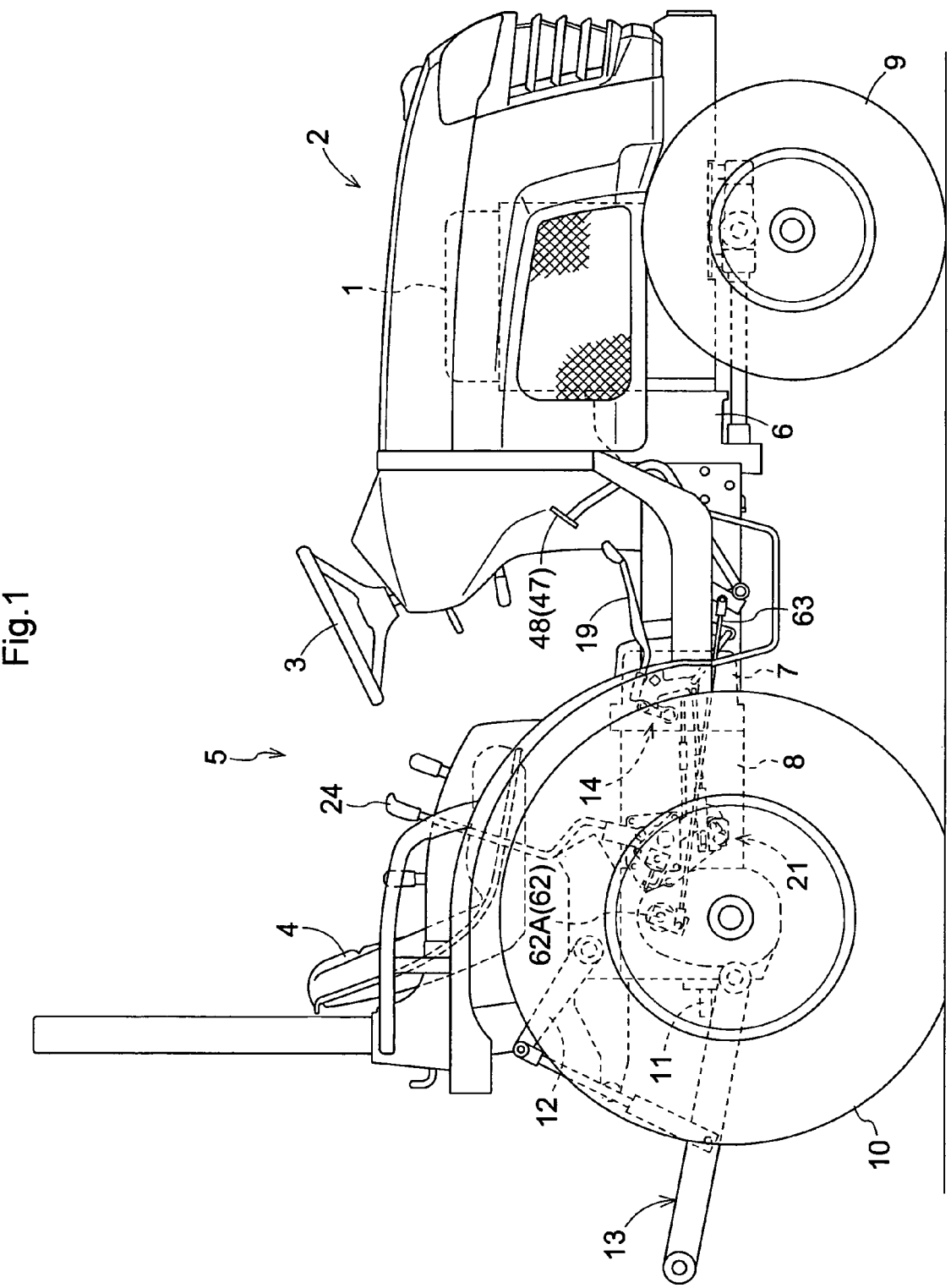
FIG. 1 is a side elevation of a tractor.
Figure 2:
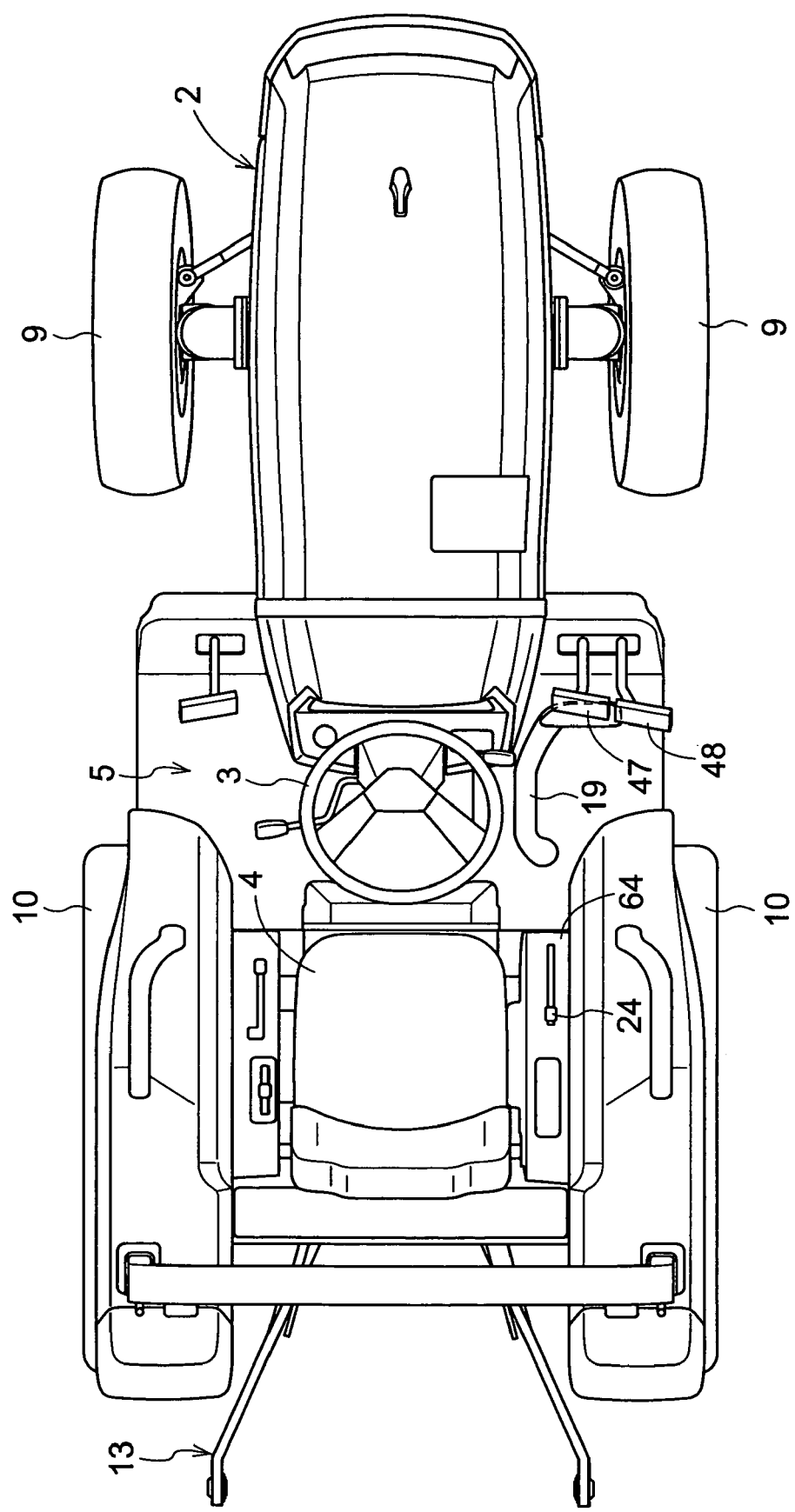
FIG. 2 is a plan view of the tractor.

FIG. 1 shows a side elevation of a tractor which is one example of working vehicles. FIG. 2 shows a plan view of the tractor. This tractor includes a motor section 2 having an engine 1 mounted on a forward half thereof, and a driving platform 5 having a steering wheel 3 and a driver's seat 4 arranged on the rearward half. Power of the engine 1 is transmitted through a main clutch 6 to a hydrostatic stepless transmission (HST) 7 acting as a main change speed apparatus. Power outputted at varied speeds from the hydrostatic stepless transmission 7 is transmitted through a propelling power transmitting system housed in a transmission case 8 to a pair of right and left front wheels 9 and a pair of right and left rear wheels 10. Drive outputted at a constant speed from the hydrostatic stepless transmission 7 is transmitted through a working power transmitting system housed in the transmission case 8 to a power takeoff shaft 11 disposed at the rear end of the transmission case 8.

The transmission case 8 has, attached to rear positions thereof, a pair of right and left lift arms 12 hydraulically pivotable up and down, and a link mechanism 13 pivotably interlocked to these lift arms 12. Various working implements and loading platforms may be connected to the tractor through the link mechanism 13. Power taken from the power takeoff shaft 11 can be transmitted to a working implement connected to the link mechanism 13.

Though not shown, the propelling power transmitting system includes a gear type change speed device acting as an auxiliary change speed device, a differential gear for the rear wheels, and an auxiliary clutch for the front wheels. The working power transmitting system includes a working clutch.

Figure 3:
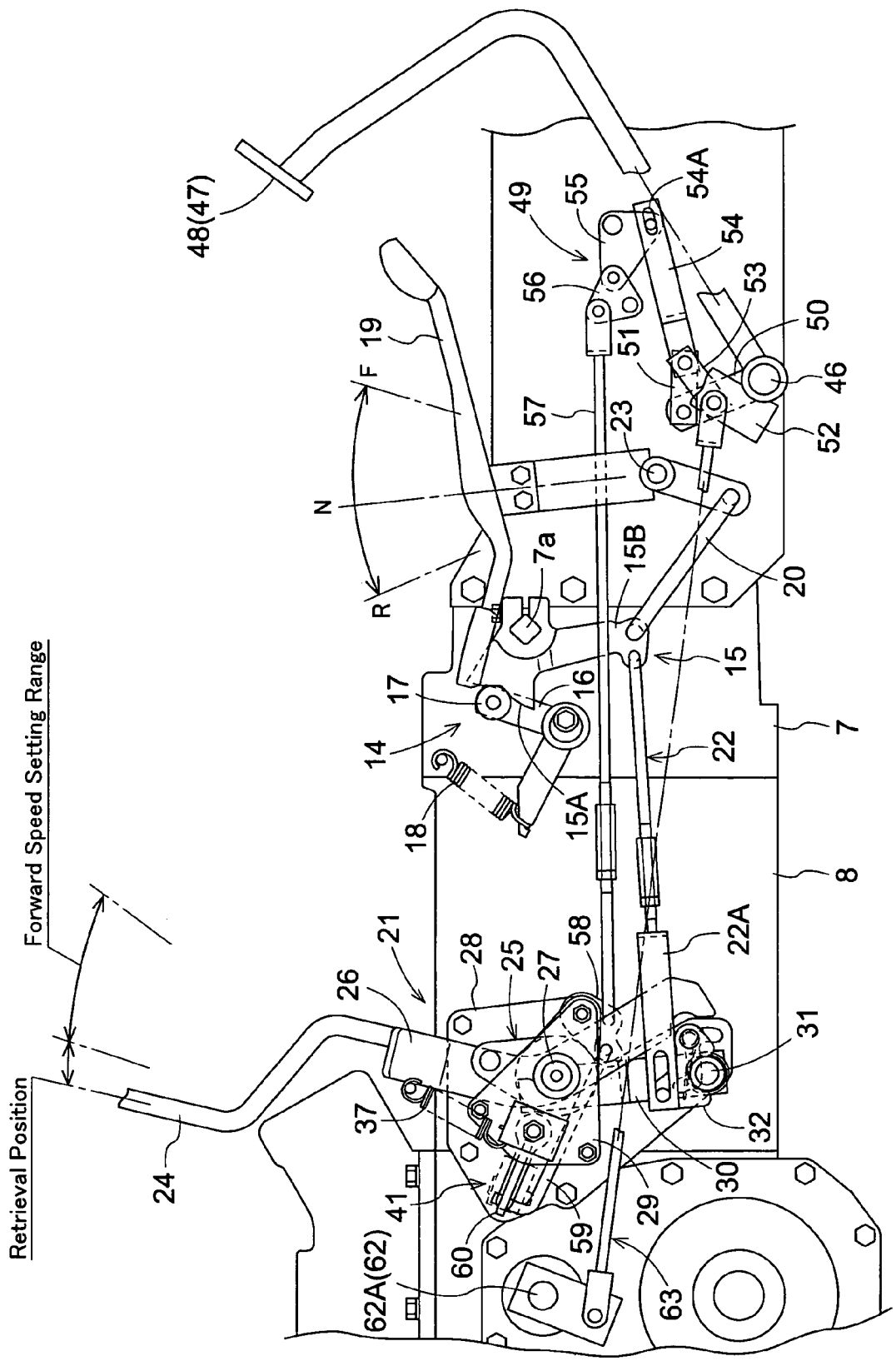
FIG. 3 is a side view showing a control system for a stepless transmission.
Figure 4:
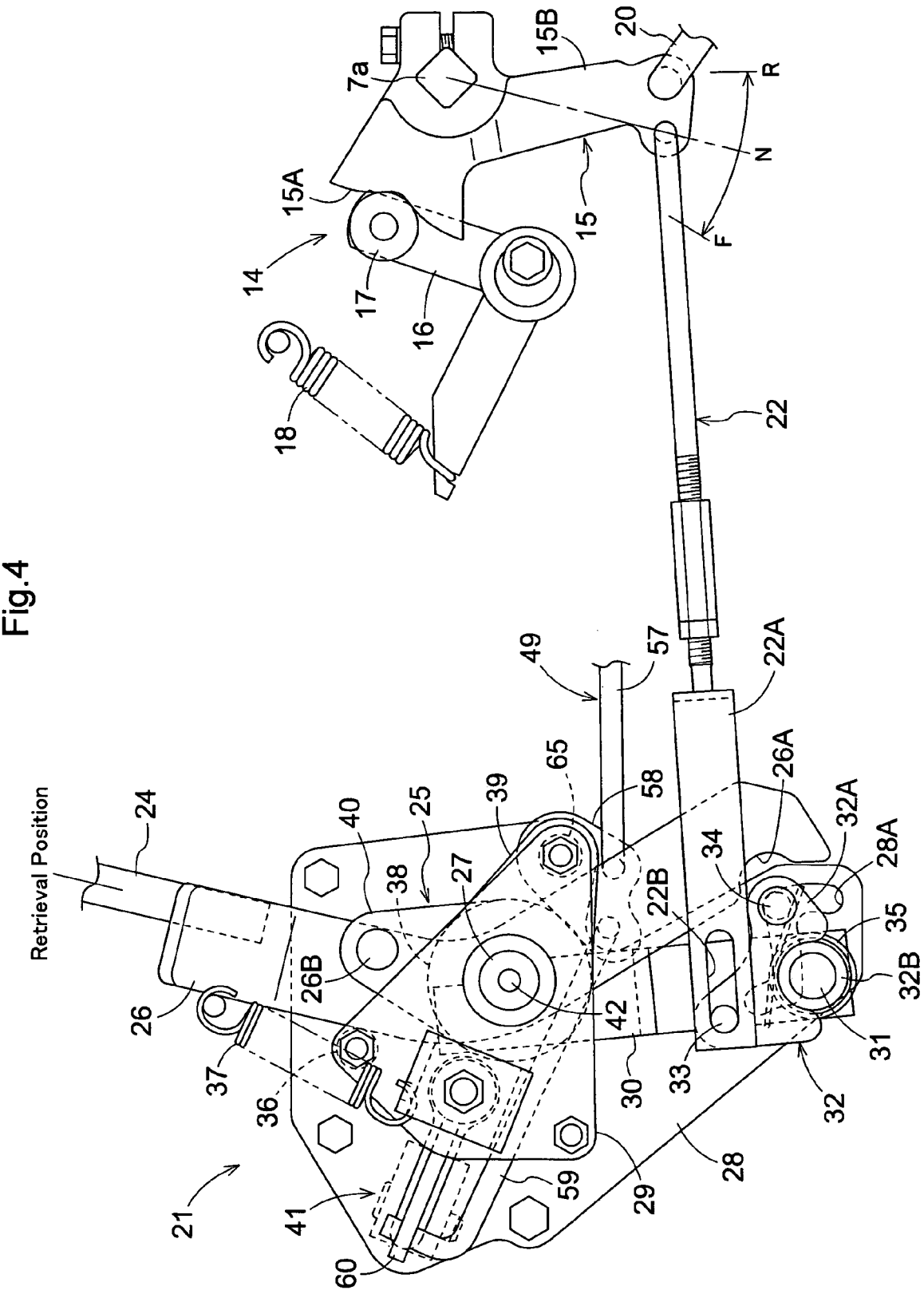
FIG. 4 is a side view showing a state of a speed maintaining apparatus canceling a setting and a change speed pedal not operated.
Figure 5:
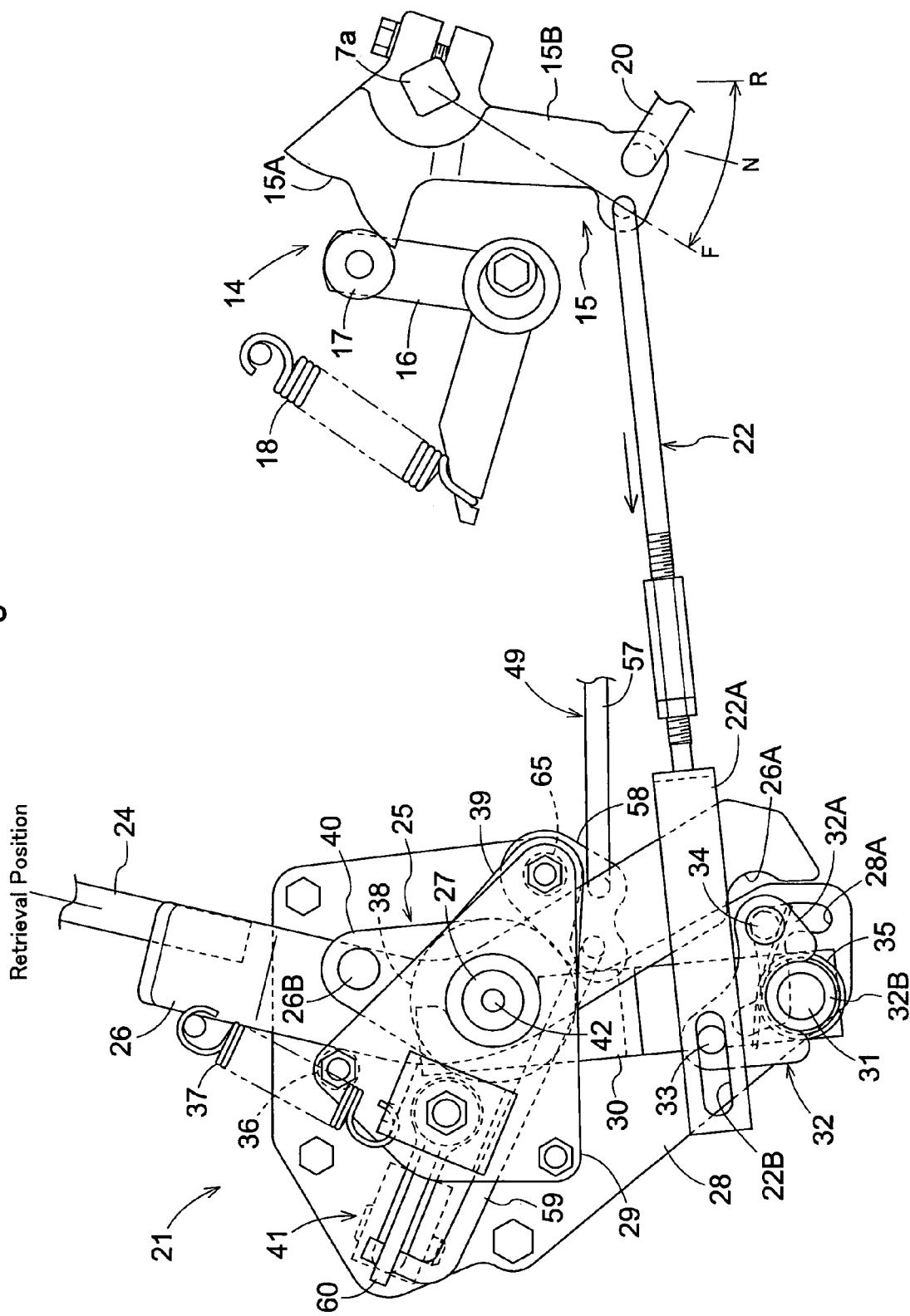
FIG. 5 is a side view showing a state of the speed maintaining apparatus canceling a setting and the change speed pedal operated for forward drive acceleration.
Figure 6:
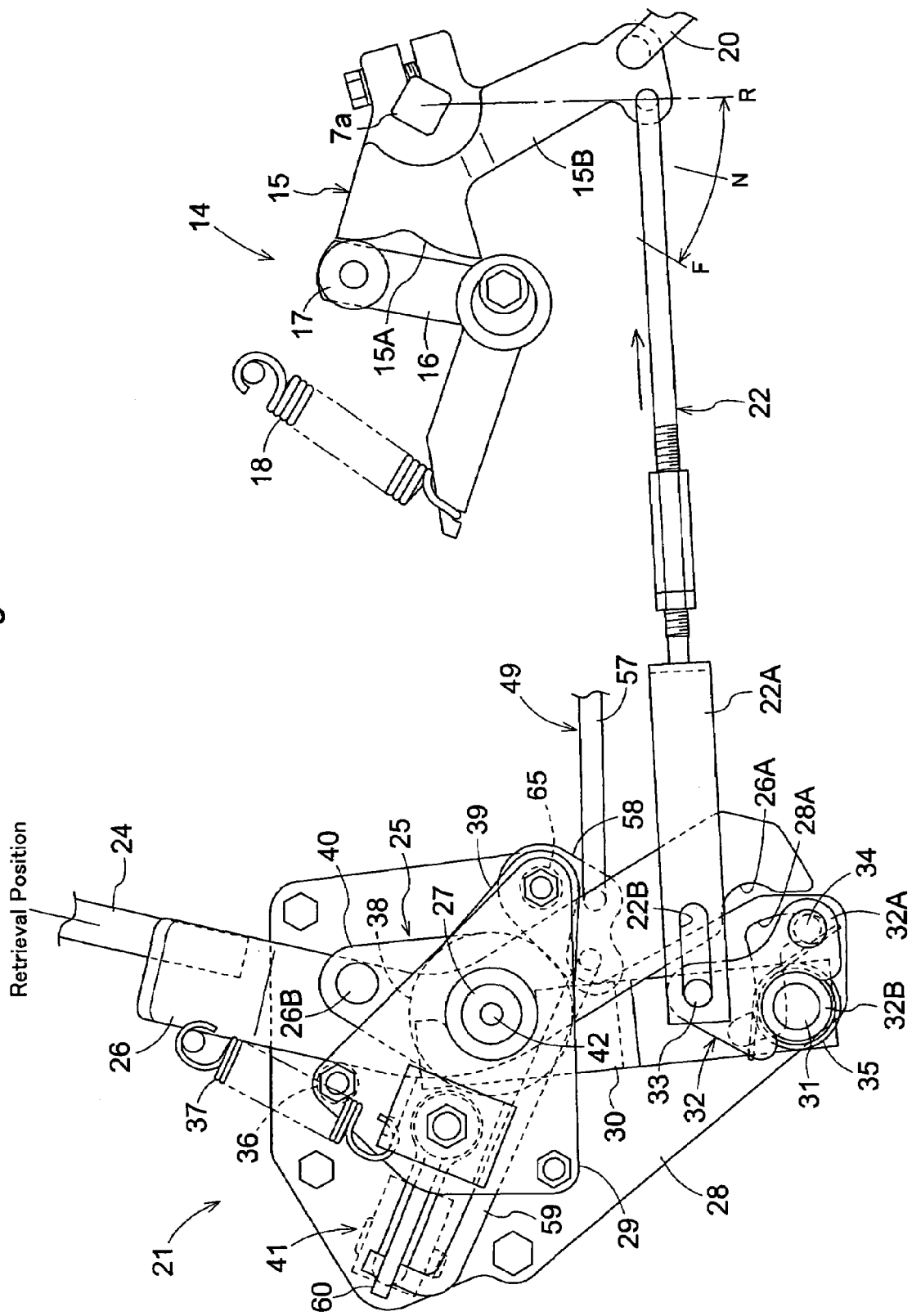
FIG. 6 is a side view showing a state of the speed maintaining apparatus canceling a setting and the change speed pedal operated for backward drive acceleration.
Figure 7:
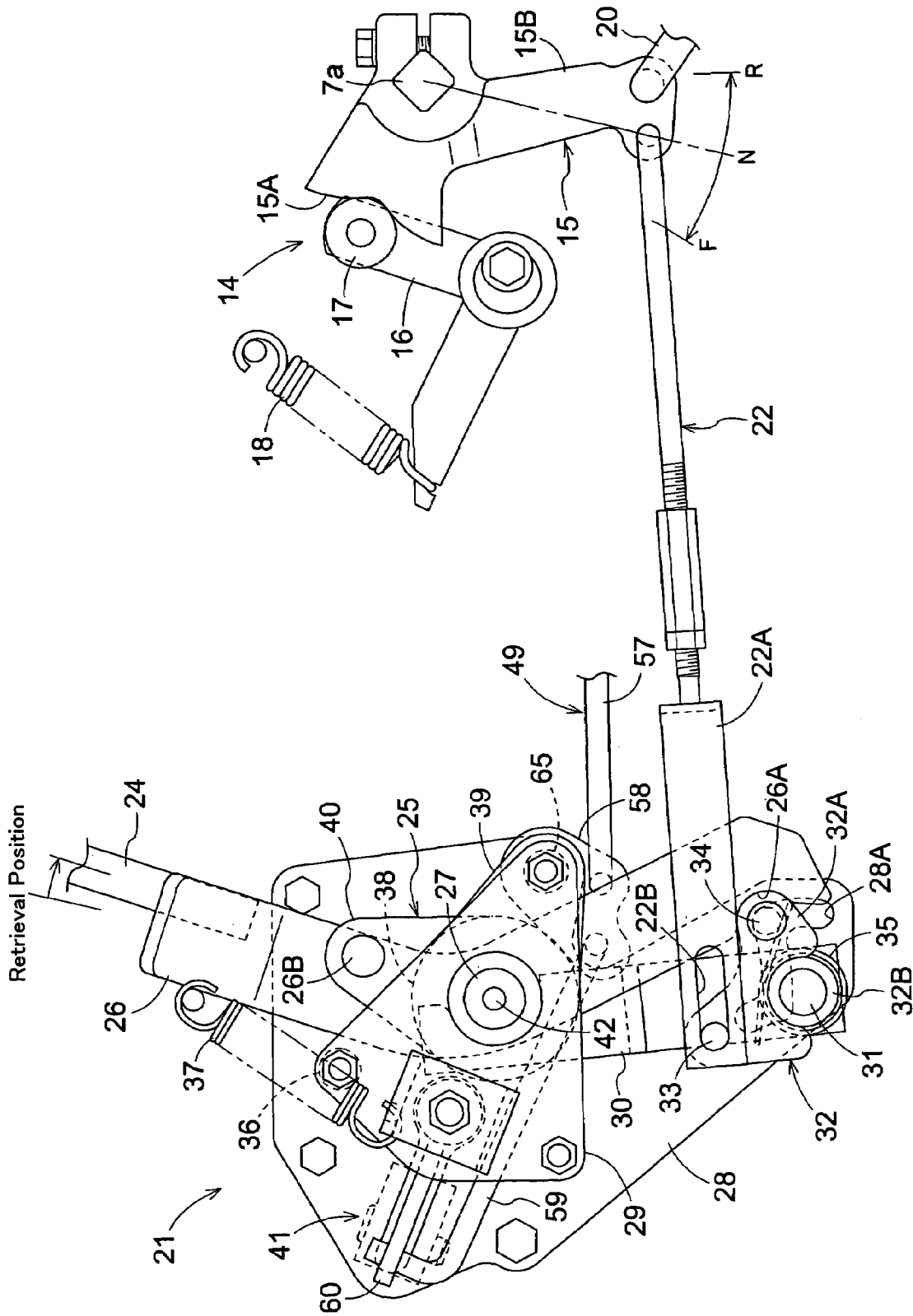
FIG. 7 is a side view showing a state of the speed maintaining apparatus setting zero speed and the change speed pedal not operated.
Figure 8:
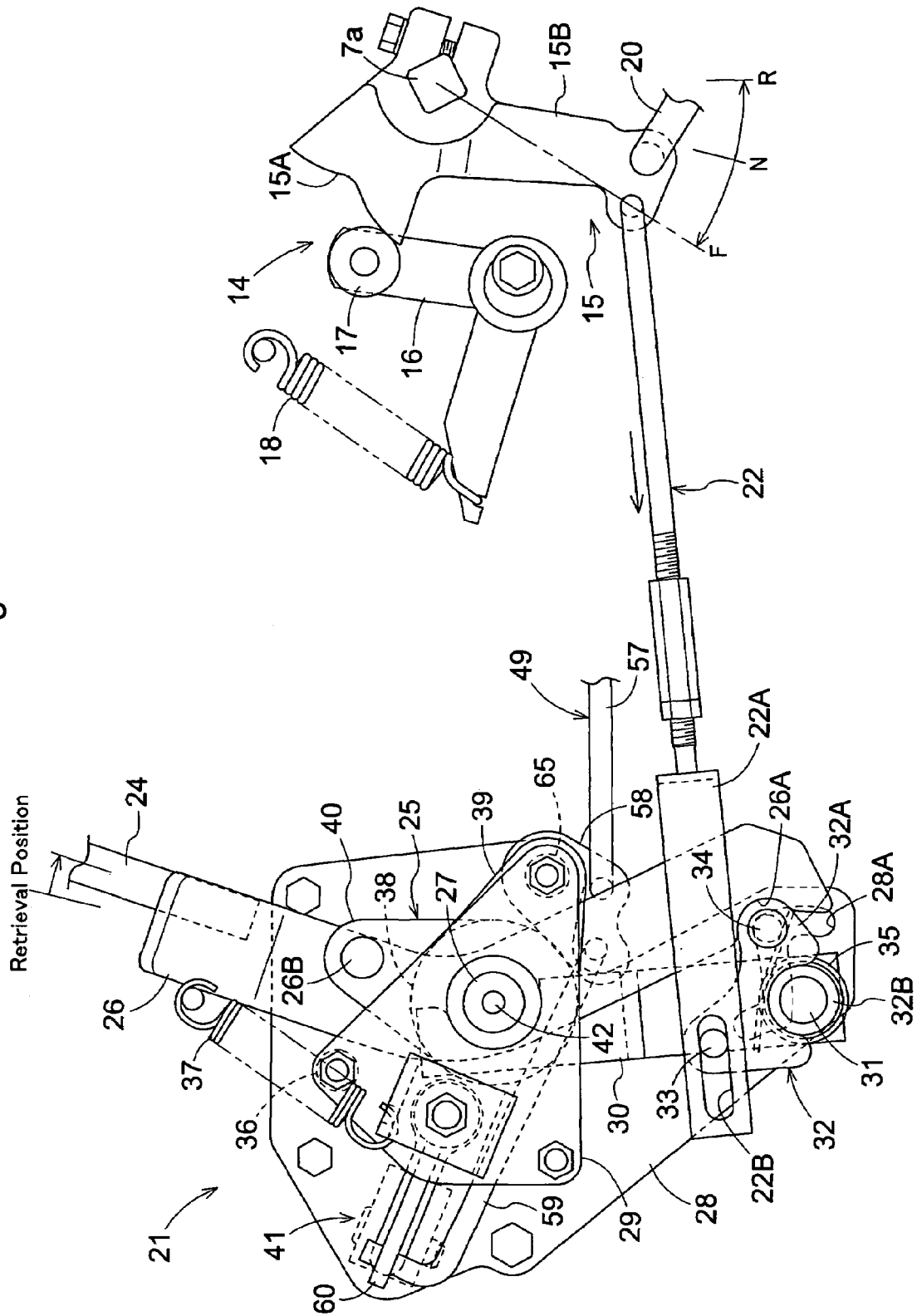
FIG. 8 is a side view showing a state of the speed maintaining apparatus setting zero speed and the change speed pedal operated for forward drive acceleration.

As shown in FIGS. 1-3, the hydrostatic stepless transmission 7 is returned to and maintained in neutral state by the action of a neutral return mechanism 14 disposed on the right side of the transmission 7. The neutral return mechanism 14 returns and maintains the hydrostatic stepless transmission 7 to/in neutral state by placing a roller 17 attached to a free end of a rocking arm 16, by the action of a tension spring 18, in a V-shaped cam recess 15A formed in a cam arm 15 rigidly connected to a trunnion 7a of the hydrostatic stepless transmission 7.

An arm portion 15B of the cam arm 15 is linked through a rod 20 to a change speed pedal 19 disposed in a right forward position on the driving platform 5. The arm portion 15B is also linked to a speed maintaining means 21 disposed on the right side of the transmission case 8, through a link member 22 having an adjustable length.

The change speed pedal 19 is a seesaw-like device pivotable about a support shaft 23 extending transversely of the tractor. When a forward portion of the pedal 19 is depressed, the hydrostatic stepless transmission 7 is shifted for forward drive speed changing against the action of the neutral return mechanism 14. When a rearward portion of the pedal 19 is depressed, the hydrostatic stepless transmission 7 is shifted for backward drive speed changing against the action of the neutral return mechanism 14.

As described in detail hereinafter, when a speed setting lever (an example of control lever) 24 of the speed maintaining means 21 is swung to a forward speed setting range, the hydrostatic stepless transmission 7 is shifted for forward drive speed changing against the action of the neutral return mechanism 14. A friction type retaining mechanism 25 retains the speed setting lever 24 in a desired control position in the forward speed setting range against the action of the neutral return mechanism 14. This frictional retaining action retains the hydrostatic stepless transmission 7 in a forward speed position to maintain a constant forward speed state corresponding to the control position of the speed setting lever 24 in the forward speed setting range.

As shown in FIGS. 3-13, the speed setting lever 24 of the speed maintaining means 21 is fixedly connected to a tubular rotary shaft 27 through a control member 26 formed of sheet metal and having a bent or angular shape in side view. Using this rotary shaft 27 as the fulcrum, the speed setting lever 24 is pivotable fore and aft through the forward speed setting range, and pivotable fore and aft from the forward speed setting range to and from a retreat position set rearwardly of the forward speed setting range.

The rotary shaft 27 is relatively rotatably and relatively slidably supported by right and left plate-like support members 28 and 29 bolted to the right side of the transmission case 8. The rotary shaft 27 relatively rotatably supports a boss portion 30A of a relay rocking element 30. A fulcrum pin 31 extending transversely of the tractor is fixed to a free end of the relay rocking element 30. The fulcrum pin 31 relatively rotatably supports a boss portion 32B of an auxiliary rocking element 32 having a bifurcated rocking portion 32A formed of sheet metal. An end portion 22A of the link member 22 is connected to one free end of the rocking portion 32A through a link pin 33.

Figure 10:
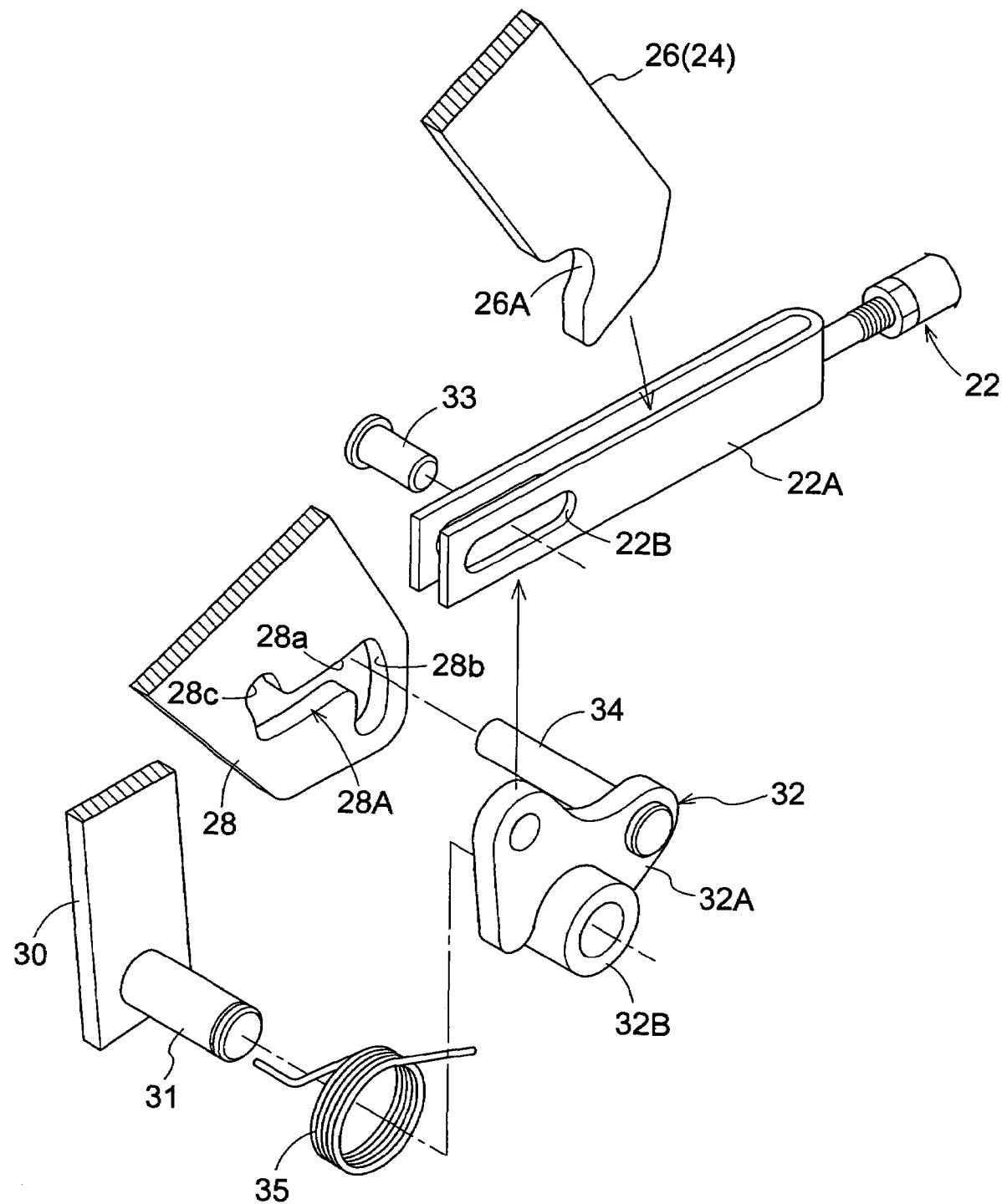
FIG. 10 is an exploded perspective view of a principal portion of the speed maintaining apparatus.

As best shown in FIG. 10, the other free end of the rocking portion 32A of the auxiliary rocking element 32 supports an engaging pin 34 extending transversely of the tractor and guided by a guide bore 28A formed in the left support member 28. A torsion spring 35 is disposed on the boss portion 32B of the auxiliary rocking element 32 for contacting the engaging pin 34 and relay rocking element 30. The torsion spring 35 biases the engaging pin 34 into contact with an upper edge of the guide bore 28A, thereby holding the auxiliary rocking element 32 in a predetermined posture relative to the relay rocking element 30.

Figure 9:
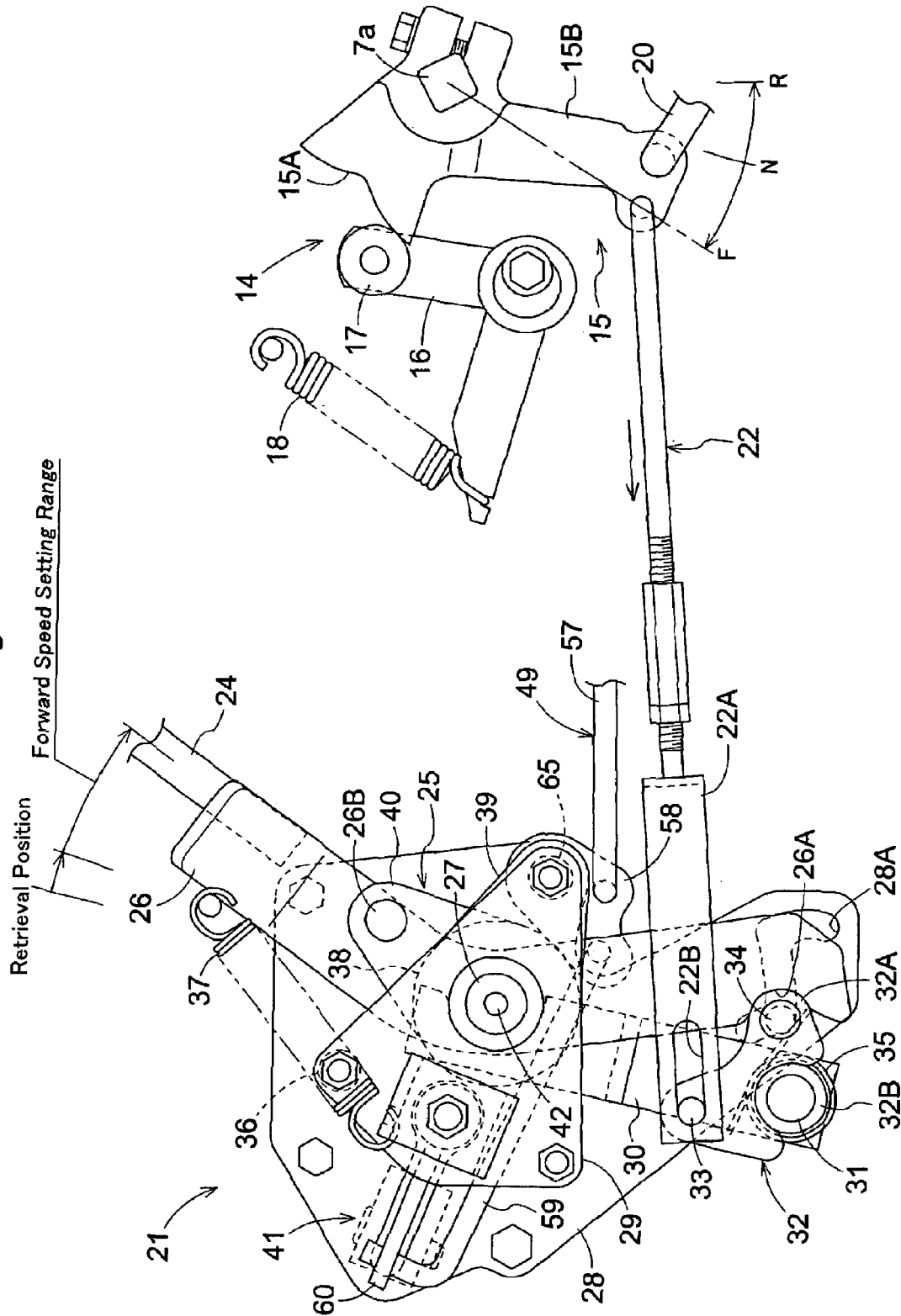
FIG. 9 is a side view showing a state of the speed maintaining apparatus setting forward drive and the change speed pedal not operated.

As shown in FIGS. 9 and 10, the control member 26 has an engaging recess 26A formed in a rear portion at the lower free end thereof. As the speed setting lever 24 is pivoted from the retreat position to the forward speed setting range, the engaging recess 26A engages the other free end of the rocking portion 32A of the auxiliary rocking element 32 to prevent pivoting movement of the auxiliary rocking element 32 relative to the relay rocking element 30. As the speed setting lever 24 is pivoted from the forward speed setting range to the retreat position, the engaging recess 26A separates from the other free end of the rocking portion 32A to permit pivoting movement of the auxiliary rocking element 32 relative to the relay rocking element 30. When the speed setting lever 24 is pivoted in the forward speed setting range, while the auxiliary rocking element 32 is prevented from pivoting relative to the relay rocking element 30, the auxiliary rocking element 32 is pressed by a control amount corresponding to a control position of the speed setting lever 24 in the forward speed setting range. This pivots and displaces the relay rocking element 30 from a standard posture (i.e. posture corresponding to the neutral state of the hydrostatic stepless transmission 7) to a forward shifting range disposed rearward.

As shown in FIG. 10, the guide bore 28A includes an arcuate guide portion 28a for forward drive speed changing formed to extend rearward from a position corresponding to a standard position (i.e. position corresponding to the neutral state of the hydrostatic stepless transmission 7) of the engaging pin 34 in the left support member 28 with respect to the rotary shaft 27 acting as the fulcrum, an arcuate guide portion 28b for backward drive speed changing formed to extend downward from the position corresponding to the standard position of the engaging pin 34 in the left support member 28 with respect to the fulcrum pin 31 acting as the fulcrum with the relay rocking element 30 in the standard posture, and an opening 28c for attachment formed to extend upward from the rear end of the guide portion 28a for forward drive speed changing.

Figure 11:
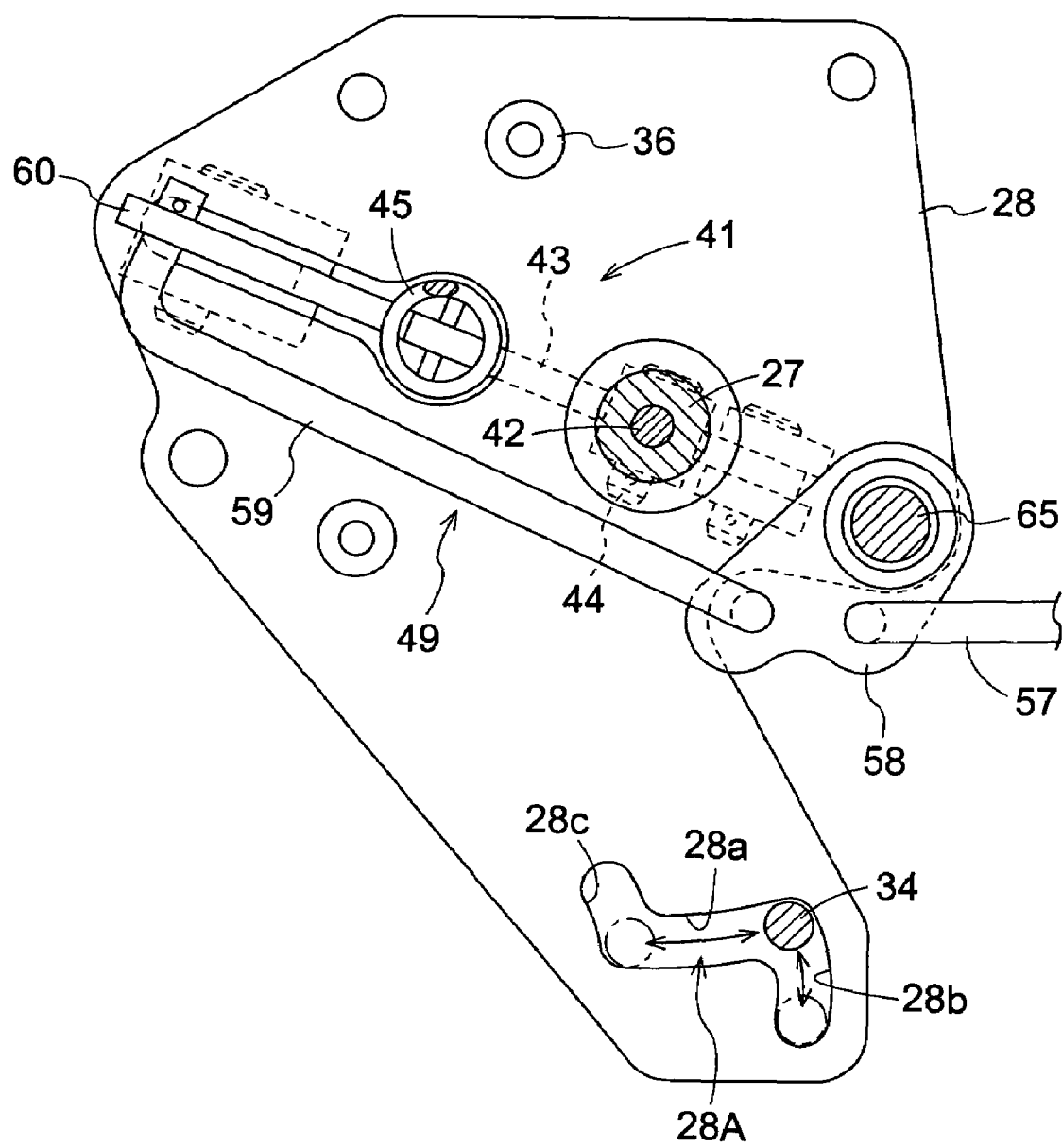
FIG. 11 is a side view in vertical section of the speed maintaining apparatus.

As shown in FIG. 11, the left support member 28 has a stopper 36 for contacting the control member 26 for restricting pivoting movement backward from the retreat position of the speed setting lever 24. A tension spring 37 is disposed between the control member 26 and left support members 28 for biasing the speed setting lever 24 toward the stopper 36.

As shown in FIG. 10, the end portion 22A of the link member 22 is U-shaped in plan view, i.e. has two legs. Thus, the end portion 22A prevents relative displacement in the right and left direction (axial direction) of the rocking portion 32A of the auxiliary rocking element 32 and the control member 26. With the control member 26 lying between the two legs of the end portion 22A, the end portion 22A is linked to the rocking portion 32A of the auxiliary rocking element 32 by a pin 33. The two legs of the end portion 22A define slots 22B as play-accommodating portions for permitting displacement of the link member 22 relative to the auxiliary rocking element 32 when the change speed pedal 19 is operated for shifting of the hydrostatic stepless transmission 7 in forward drive state.

Figure 12:
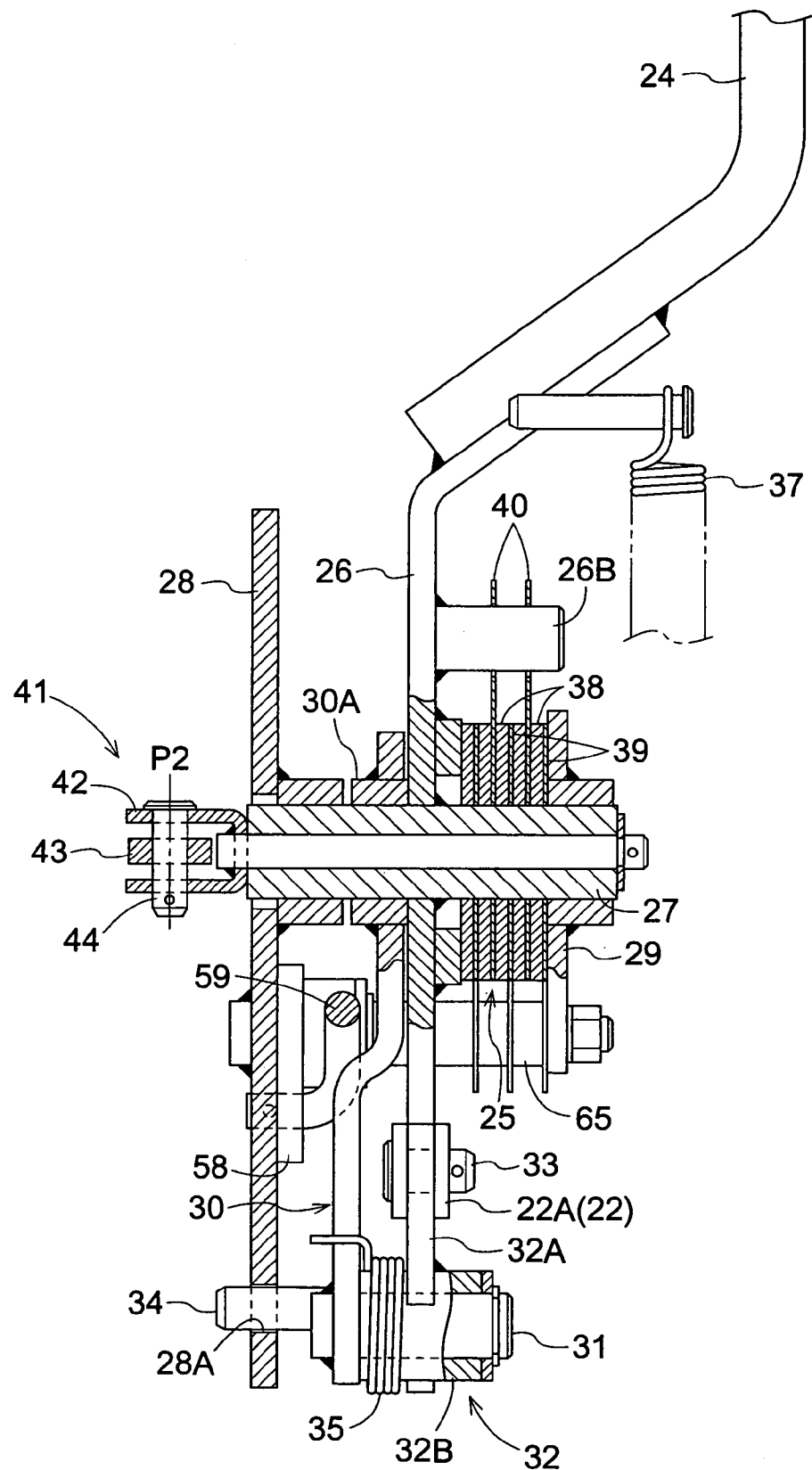
FIG. 12 is a rear view in vertical section showing a retaining construction of the speed maintaining apparatus.

As shown in FIG. 12, the retaining mechanism 25 includes, arranged on the rotary shaft 27 between the control member 26 and right support members 29, a plurality of friction disks 38, a plurality of fixed plates (an example of friction plates) 39 held against rotation by a fixed shaft 65 extending between the right and left support members 28 and 29, and a plurality of rocking plates (an example of friction plates) 40 fitted on a link pin 26B projecting from the control member 26 to be pivotable with the control member 26. A biasing device 41 described hereinafter presses on the rotary shaft 27, whereby the control member 26 fixed to the rotary shaft 27 is pressed against the right support member 29 through these disks 38 and plates 39 and 40. A frictional retaining force thereby produced retains the speed setting lever 24 in a desired control position in the forward shifting range against the action of the neutral return mechanism 14 and the action of the tension spring 37.

Figure 13:
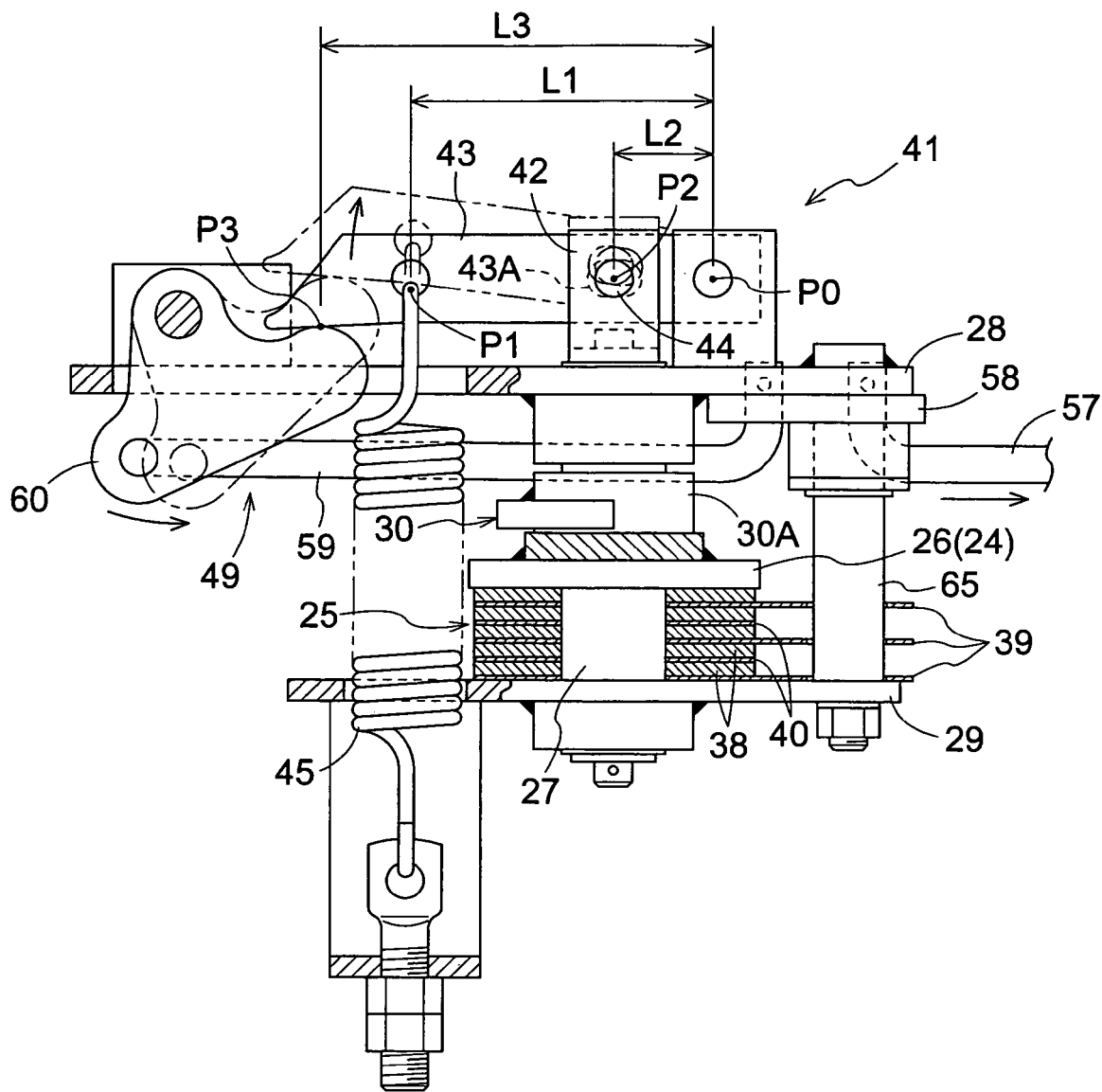
FIG. 13 is a plan view in cross section showing a canceling construction of the speed maintaining apparatus.

As shown in FIG. 13, the biasing device 41 includes a slide element 42 slidable with the rotary shaft 27 relative to the right and left support members 28 and 29, and permits relative rotation of the rotary shaft 27, a rocking arm 43 pin-connected to the left support member 28 to be pivotable in sliding directions, a link pin 44 for interlocking the slide element 42 to the rocking arm 43, and a tension spring 45 for biasing the rocking arm 43 toward the right support member 29. The tension spring 45 pivots the rocking arm 43 to slide the slide element 42 through the link pin 44, thereby pressing the control member 26 with the rotary shaft 27 toward the right support member 29.

The rocking arm 43 has a distance L1 from a rocking fulcrum P0 to a point of application P1 acted on by the tension spring 45, set larger than a distance L2 from the rocking fulcrum P0 to a point of application P2 for acting on the slide element 42 and rotary shaft 27. This provides a greater frictional retaining force than where the tension spring 45 directly slides the rotary shaft 27.

The rocking arm 43 defines a slot 43A as a play-accommodating portion for permitting displacement of the link pin 44 relative to the rocking arm 43 accompanying an interlocked movement of the rocking arm 43 and slide element 42.

Left and right brake pedals 47 and 48 are arranged forwardly of the change speed pedal 19 on the driving platform 5 to be pivotable about a support shaft 46 extending transversely of the tractor. The retaining mechanism 25 is linked to the brake pedals 47 and 48 through a release interlocking mechanism 49 for canceling the frictional retention of the speed setting lever 24 when the brake pedals 47 and 48 are depressed to brake or decelerate the tractor.

The release interlocking mechanism 49 includes a left link 51 having one end thereof pin-connected to a left rocking arm 50 pivotable with the left brake pedal 47, and a right link 53 having one end thereof pin-connected to a right rocking arm 52 pivotable with the right brake pedal 48. The other end portion of the left link 51 and the other end of the right link 53 interlocked through an interlocking link 54, a first rocking arm 55, a second rocking arm 56, a first rod 57 having an adjustable length, a third rocking arm 58 and a second rod 59 to a release arm (an example of operating device) 60 provided on the left support member 28. When one of the left and right brake pedals 47 and 48 is depressed, the resulting operating force is absorbed by relative pivoting of the left and right links 51 and 53 and the interlocking link 54, whereby the retaining mechanism 25 maintains the state retaining the speed setting lever 24. When both of the left and right brake pedals 47 and 48 are depressed, the resulting operating force is transmitted to the release arm 60 by displacement together of the left and right links 51 and 53 and the interlocking link 54. This operating force swings the release arm 60 to swing the rocking arm 43 in the direction opposed to the action of the tension spring 45, thereby canceling the state of retaining the speed setting lever 24 by the retaining mechanism 25.

As shown in FIG. 13, the rocking arm 43 has a distance L3 from the rocking fulcrum P0 to a point of application P3 acted on by the release arm 60, set larger than the distance L1 from the rocking fulcrum P0 to the point of application P1 acted on by the tension spring 45. Consequently, an operating force smaller than the biasing force of the tension spring 45 can slide the rotary shaft 27 in the direction opposed to the action of the tension spring 45, thereby canceling the frictional retention of the speed setting lever 24 with ease.

The interlocking link 54 defines a slot 54A as a play-accommodating portion for permitting relative pivoting of the left and right links 51 and 53 and interlocking linking link 54 when one of the left and right brake pedals 47 and 48 is depressed. The first rocking arm 55 defines a slot (not shown) as a play-accommodating portion for permitting relative pivoting between the first rocking arm 55 and second rocking arm 56.

The left and right brake pedals 47 and 48 are linked through linking mechanisms 63 to control shafts 62A of corresponding left and right brake mechanisms 62 arranged in the transmission case 8. When one of the brake pedals 47 and 48 is depressed to operate the corresponding brake mechanism 62, the tractor can make a turn with the rear wheel 10 braked by the brake mechanism 62 moving along an inner track of the turn. When both of the brake pedals 47 and 48 are depressed to operate the left and right brake mechanisms 62, the two brake mechanisms 62 can brake or decelerate the left and right rear wheels 10.

With the above construction, when, using the rotary shaft 27 extending transversely of the tractor, the speed setting lever 24 is pivoted from the retreat position into the forward speed setting range disposed forwardly thereof which is a forward drive accelerating direction, the engaging recess 26A of the control member 26 engages the other free end of the auxiliary rocking element 32, to prevent pivoting movement of the auxiliary rocking element 32 relative to the relay rocking element 30. When the speed setting lever 24 is thereafter pivoted in the forward speed setting range, as shown in FIG. 9, the control member 26 pivots, through the auxiliary rocking element 32, the relay rocking element 30 along the guide portion 28a for forward drive speed changing of the guide bore 28A by a control amount corresponding to a control position of the speed setting lever 24 in the forward speed setting range. The hydrostatic stepless transmission 7 is shifted to a different forward speed by an amount corresponding to an amount of pivoting of the relay rocking element 30 at this time. This forward speed state is maintained by frictional retention of the speed setting lever 24 by the retaining mechanism 25. As a result, the tractor is driven at a forward speed corresponding to the control position of the speed setting lever 24.

In this constant speed forward drive state, the change speed pedal 19 linked to the hydrostatic stepless transmission 7 is maintained in an operating position corresponding to the shifted state of the hydrostatic stepless transmission 7 at this time, while being permitted to pivot in a forward drive accelerating direction from the operating position. As a result, a forward drive shifting operation may be carried out by depressing the change speed pedal 19 from this operating position in the forward drive accelerating direction.

When, in this constant speed forward drive state, one of the left and right brake pedals 47 and 48 is depressed, a braked turning state is produced with the corresponding rear wheel 10 braked by a braking force corresponding to the amount of depression at that time, while maintaining the constant speed forward drive state. When the depression is canceled, a change is made from the braked turning state back to the constant speed forward drive state.

When, in this constant speed forward drive state, both of the left and right brake pedals 47 and 48 are depressed, the left and right brake mechanisms 62 brake the left and right rear wheels 10, and at the same time their operating force is transmitted to the retaining mechanism 25 through the release interlocking mechanism 49 to cancel the frictional retention of the speed setting lever 24 by the retaining mechanism 25. This effects a switch from the constant speed forward drive state to a normal running state. The speed setting lever 24 is swung to the retreat position by the action of the tension spring 37, and the neutral return mechanism 14 causes the relay rocking element 30 to pivot with the auxiliary rocking element 32 along the guide portion 28a for forward speed changing of the guide bore 28A back to the standard posture. This returns the hydrostatic stepless transmission 7 to the neutral state. As a result, the left and right brake mechanisms 62 brakes and decelerates the tractor effectively.

In the normal running state, the speed setting lever 24 is located in the retreat position to cancel the engagement between the engaging recess 26A of the control member 26 and the other free end of the auxiliary rocking element 32. This permits pivoting movement of the auxiliary rocking element 32 relative to the relay rocking element 30. When the change speed pedal 19 is operated to shift the hydrostatic stepless transmission 7 to a different backward speed, the auxiliary rocking element 32, in response to this shifting operation, pivots along the guide portion 28b for backward drive speed changing of the guide bore 28A relative to the relay rocking element 30 and against the action of the torsion spring 35 The relay rocking element 30 is maintained in the standard posture.

That is, a very small gap is formed between the control member 26 and auxiliary rocking elements 32 to cancel the engagement thereof and permit rocking movement of the auxiliary rocking element 32 relative to the relay rocking element 30 in the normal running state. For this purpose, a lever guide 64 (see FIG. 2) provides a very short operating region between the forward shifting range and retreat position. This simple construction allows the change speed pedal 19 to shift the hydrostatic stepless transmission 7 to a different backward drive speed effectively in the normal running state.

Consequently, a large region is secured as the forward speed setting range of the speed setting lever 24 in the lever guide 64 having a limited size. Thus, while forming the speed setting lever 24 having an extended length to lighten the operating effort, a large angle is secured as an operating angle of the speed setting lever 24. This allows the speed setting lever 24 to operate for a precise forward speed setting.

On the other hand, the change speed pedal 19 is operated to shift the hydrostatic stepless transmission 7 to a different forward speed in the normal running state, its operating force is absorbed by the slots 22B formed in the end portions 22A of the link member 22. This prevents interlocked rocking of the relay rocking element 30 and auxiliary rocking element 32 accompanying the shifting operation.

Other Embodiments

Other embodiments of this invention are listed hereinafter.

[1] The working vehicle may be an agricultural working vehicle such as a rice planting machine or a combine harvester, a working vehicle for construction such as a wheel loader, a lawn mower or a truck.

[2] The control lever 24 may be an accelerator lever for setting an engine speed, or a lift lever for raising and lowering a working implement.

[3] As the spring 45 of the biasing device 41, a pressing spring or torsion spring may be employed instead of the tension spring.

[4] The biasing device 41 may have a pressing spring 45 mounted between a spring bearing at the right end of the rotary shaft 27 or the right end of the slide element 42 and the right support member 29. The pressing spring 45 slides the control member 26 fixed to the rotary shaft 27, through the plurality of friction disks 38 and friction plates 39 and 40, in the direction for pressure contact with the right support member 29.

[5] The operating device 60 may be operated manually to cancel the action of the retaining mechanism 25.

[6] The retaining mechanism 25 may be constructed to engage and retain the speed setting lever 24.

[7] The control member 26 may be constructed engageable with the auxiliary rocking element 32, to restrict only the pivoting movement in the backward drive accelerating direction of the auxiliary rocking element 32 relative to the relay rocking element 30. In this case, it is desirable to improve the guide bore 28A by omitting the opening 28c illustrated in the foregoing embodiment, or forming an opening of different shape to the opening 28c illustrated by the foregoing embodiment.

[8] The control member 26 may be constructed to press on the relay rocking element 30 directly, without using the auxiliary rocking element 32 as intermediary.

[9] The end portion 22A of the linking element 22 may be linked to the auxiliary rocking element 32 without straddling the control member 26. In this case, an improvement should desirably be made by forming one or both of the control member 26 and auxiliary rocking element 32 to have a wide engaging or pressing portion or portions, so that a relative displacement in the direction of the pivoting axis between the control member 26 and auxiliary rocking element 32 may not result in a failure of the control member 26 to press on the auxiliary rocking element 32 or of engagement between the control member 26 and auxiliary rocking element 32.

[10] The relay rocking element 30 or auxiliary rocking elements 32 or both may be adapted pivotable in response to a forward drive shifting operation of the hydrostatic stepless transmission 7 by the change speed pedal 19.

What is claimed is:

1. A working vehicle with a speed maintaining apparatus, comprising:
    a plurality of wheels including at least one driven wheel;
    a vehicle body supported by said plurality of wheels;
    an engine supported by said vehicle body;
    a stepless transmission driven by said engine and capable of changing speed of rotational power to said driven wheel;
    a neutral return device for biasing said stepless transmission toward a neutral position;
    a change speed pedal operatively connected to said stepless transmission;
    a speed maintaining means for maintaining said stepless transmission in a desired speed position;
    a speed setting lever movable to a retreat position and to positions in a forward speed range for setting said stepless transmission to the desired speed position in which said stepless transmission is maintained by said speed maintaining means;
    a relay rocking element connected to said stepless transmission through an auxiliary rocking element pivotable relative to said relay rocking element; and
    a control member provided in said speed maintaining means to be movable with said speed setting lever, said control member contacting and retaining said auxiliary rocking element in response to a movement of the speed setting lever from and retreat position to a position in said forward speed range, thereby restricting movement of the auxiliary rocking element relative to the relay rocking element, and allowing displacement of the relay rocking element by an amount corresponding to an amount of operation of the speed setting lever in the forward speed range, and thereby allowing the stepless transmission to be operated to the desired speed position.

2. A working vehicle as defined in claim 1, wherein, when said speed setting lever is operated to said retreat position, said control member ceases to contact with said auxiliary rocking element, thereby canceling restriction of movement of said auxiliary rocking element relative to said relay rocking element.

3. A working vehicle as defined in claim 1, further comprising a link element for operatively linking said auxiliary rocking element with said stepless transmission, said link element having two legs at an end thereof, said end being connected to said auxiliary rocking element, with said control member disposed between said two legs, to prevent relative displacement of the auxiliary rocking element and the control member in an axial direction of said auxiliary rocking element and said control member.

4. A working vehicle as defined in claim 1, further comprising a support member, said relay rocking element being pivotable about an axis of a rotary shaft supported by said support member, said support member defining a guide bore for guiding a pin attached to said auxiliary rocking element.

5. A working vehicle as defined in claim 4, wherein said guide bore is shaped to permit pivoting of only said auxiliary rocking element connected to said change speed pedal, and to cause substantially no pivoting of said relay rocking element, when said change speed pedal is operated to a backward drive position.

6. A working vehicle as defined in claim 4, wherein said rotary shaft is supported by said support member to be rotatable and axially movable relative thereto, and wherein friction plates fixed to the rotary shaft, and friction disks engageable with said friction plates are provided between said support member and said speed setting levers, wherein a biasing means is provided for biasing said rotary shaft in a direction for engaging said friction plates and said friction disks.

7. A working vehicle as defined in claim 6, further comprising:
    a rocking arm connected to said rotary shaft and pivotable about a pivot axis supported to said support member; and
    a release arm for contacting said rocking arm, said release arm being operable by at least one of left and right brake pedals of said working vehicle;
    wherein said release arm can move said rotary shaft axially thereof, whereby engagement of said friction plates and said friction disks is canceled by operation of at least one of said left and right brake pedals.

8. A working vehicle with a speed maintaining apparatus, comprising:
    a plurality of wheels including at least one driven wheel;
    a vehicle body supported by said plurality of wheels;
    an engine supported by said vehicle body;
    an HST driven by said engine and capable of changing speed of power to said driven wheel;
    a cam-spring mechanism for biasing said HST toward a neutral position;
    a change speed pedal connected to said HST for operating said HST;
    a support member fixed to said vehicle body;
    a relay rocking element pivotable relative to said support member, and connected to said HST through an auxiliary rocking element pivotable relative to said relay rocking element;
    a speed setting lever supported by said support member to be pivotable relative thereto, and movable to a retreat position and to positions in a forward speed range for setting said HST to a desired speed position;
    a plurality of friction plates arranged between said support member and said speed setting lever, and movable between a first position for maintaining said speed setting lever in a position corresponding to said desired speed position, and a second position for releasing said speed setting lever; and
    a control member movable with said speed setting lever, said control member contacting said auxiliary rocking element in response to a movement of the speed setting lever from and retreat position to a position in said forward speed range, thereby restricting movement of the auxiliary rocking element relative to the relay rocking element, and allowing displacement of the relay rocking element by an amount corresponding to an amount of operation of the speed setting lever in the forward speed range, and thereby allowing the stepless transmission to be operated to the desired speed position.

9. A working vehicle as defined in claim 8, further comprising a link element for operatively linking said auxiliary rocking element with said HST, said link element having two legs at an end thereof, said end being connected to said auxiliary rocking element, with said control member disposed between said two legs, to prevent relative displacement of the auxiliary rocking element and the control member in an axial direction of said auxiliary rocking element and said control member.

10. A working vehicle as defined in claim 9, wherein said relay rocking element is pivotable about an axis of a rotary shaft supported by said support member, said support member defining a guide bore for guiding a pin attached to said auxiliary rocking element.

11. A working vehicle as defined in claim 10, wherein said rotary shaft is supported by said support member to be rotatable and axially movable relative thereto.

12. A working vehicle as defined in claim 11, further comprising:
- a rocking arm connected to said rotary shaft and pivotable about a pivot axis supported to said support member; and
- a release arm for contacting said rocking arm, said release arm being operable by at least one of left and right brake pedals of said working vehicle;
- wherein said release arm can move said rotary shaft axially thereof, whereby engagement of said friction plates and said friction disks is canceled by operation of at least one of said left and right brake pedals.

* * * * *